(12) United States Patent
Ganguli et al.

(10) Patent No.: US 9,984,513 B2
(45) Date of Patent: May 29, 2018

(54) SYSTEM AND METHOD FOR DETERMINING VEHICLE COMPONENT CONDITIONS

(71) Applicant: Palo Alto Research Center Incorporated, Palo Alto, CA (US)

(72) Inventors: Anurag Ganguli, Milpitas, CA (US); Rajinderjeet Singh Minhas, Mountain View, CA (US); Johan de Kleer, Los Altos, CA (US)

(73) Assignee: Palo Alto Resarch Center Incorporated, Palo Alto, CA (US)

( * ) Notice: Subject to any disclaimer, the term of this patent is extended or adjusted under 35 U.S.C. 154(b) by 80 days.

(21) Appl. No.: 14/582,118

(22) Filed: Dec. 23, 2014

(65) Prior Publication Data

US 2016/0180610 A1 Jun. 23, 2016

(51) Int. Cl.
*G07C 5/08* (2006.01)
*G07C 5/00* (2006.01)
*G06Q 30/00* (2012.01)
*G06Q 10/00* (2012.01)
*G06Q 50/30* (2012.01)

(52) U.S. Cl.
CPC ........... *G07C 5/0808* (2013.01); *G06Q 10/20* (2013.01); *G06Q 30/014* (2013.01); *G06Q 30/018* (2013.01); *G07C 5/006* (2013.01); *G06Q 50/30* (2013.01)

(58) Field of Classification Search
CPC .... G07C 5/0808–5/0816; G07C 5/006; G06Q 10/20; G06Q 30/018; G06Q 30/014; G06Q 50/30; E05Y 2400/32; E05Y 2400/36; E05Y 2400/50–2400/502; E05Y 2400/554; E05Y 2400/564; E05Y 2900/50; E05Y 2900/506; E05Y 2900/51; B60W 50/0205; B60W 2050/021; B60W 50/04; B60W 50/045; G01M 17/08
USPC ... 701/31.9, 34.4, 19, 36, 45, 49, 29.1, 31.7, 701/31.8, 32.1, 30.8
See application file for complete search history.

(56) References Cited

U.S. PATENT DOCUMENTS

| | | | | |
|---|---|---|---|---|
| 5,069,000 A | * | 12/1991 | Zuckerman | B60J 5/06 49/214 |
| 5,140,316 A | * | 8/1992 | DeLand | B60J 5/06 180/271 |
| 5,239,779 A | * | 8/1993 | DeLand | B60J 5/06 49/360 |
| 5,833,301 A | * | 11/1998 | Watanabe | E05F 15/646 296/155 |
| 5,979,114 A | * | 11/1999 | Clark | B60J 5/06 49/214 |

(Continued)

FOREIGN PATENT DOCUMENTS

WO 200134446 5/2001

*Primary Examiner* — Bao Long T Nguyen
(74) *Attorney, Agent, or Firm* — Patrick J. S. Inouye; Krista A. Wittman

(57) ABSTRACT

A system and method for determining vehicle component conditions are provided. A function that maps features to door conditions is stored. Motor current measurements are obtained for a door over a predetermined time period. The features of the motor current measurements are determined based on the stored function. The features are then analyzed by mapping the features to one or more door conditions via a predetermined function. At least one condition of the door is determined based on the analyzed features.

5 Claims, 15 Drawing Sheets

(56) References Cited

U.S. PATENT DOCUMENTS

| | | | | |
|---|---|---|---|---|
| 6,064,165 A * | 5/2000 | Boisvert | ................ | B60J 7/0573 |
| | | | | 318/465 |
| 7,816,878 B2 * | 10/2010 | Heigl | .................... | E05F 15/632 |
| | | | | 318/266 |
| 2001/0022049 A1 * | 9/2001 | Clark | ......................... | B60J 5/06 |
| | | | | 49/360 |
| 2003/0007851 A1 * | 1/2003 | Heigl | ..................... | A61G 3/061 |
| | | | | 414/454 |
| 2003/0030299 A1 * | 2/2003 | Cleland | ................ | E05F 1/1091 |
| | | | | 296/146.8 |
| 2004/0124662 A1 * | 7/2004 | Cleland | ................ | E05F 1/1091 |
| | | | | 296/146.4 |
| 2006/0181108 A1 * | 8/2006 | Cleland | ................... | E05F 15/63 |
| | | | | 296/146.4 |
| 2006/0255757 A1 | 11/2006 | Sommer | | |
| 2007/0139216 A1 | 6/2007 | Breed | | |
| 2012/0180391 A1 * | 7/2012 | McKee | ................ | H02P 29/028 |
| | | | | 49/28 |
| 2015/0059247 A1 * | 3/2015 | Inatama | ................ | E05F 15/632 |
| | | | | 49/13 |

* cited by examiner

|        | NORMAL | F1    | F2    | F3    | F4    | F5   |
|--------|--------|-------|-------|-------|-------|------|
| NORMAL | 95.1% | 0.5%  | 0     | 0     | 0     | 0    |
| F1     | 7.4%   | 90.7% | 0     | 0     | 1.8%  | 0    |
| F2     | 3.7%   | 3.7%  | 62.9% | 14.8% | 14.8% | 0    |
| F3     | 0      | 0     | 44.4% | 55.6% | 0     | 0    |
| F4     | 0      | 7.4%  | 18.5% | 3.7%  | 70.4% | 0    |
| F5     | 0      | 0     | 0     | 0     | 0     | 100% |

FIG. 4

|          | NORMAL | F1    | F2+F3+F4 | F5   |
|----------|--------|-------|----------|------|
| NORMAL   | 94.1% | 0.5%  | 0        | 0    |
| F1       | 5.6%   | 92.6% | 1.8%     | 0    |
| F2+F3+F4 | 1.4%   | 0     | 98.6%    | 0    |
| F5       | 0      | 0     | 0        | 100% |

FIG. 5

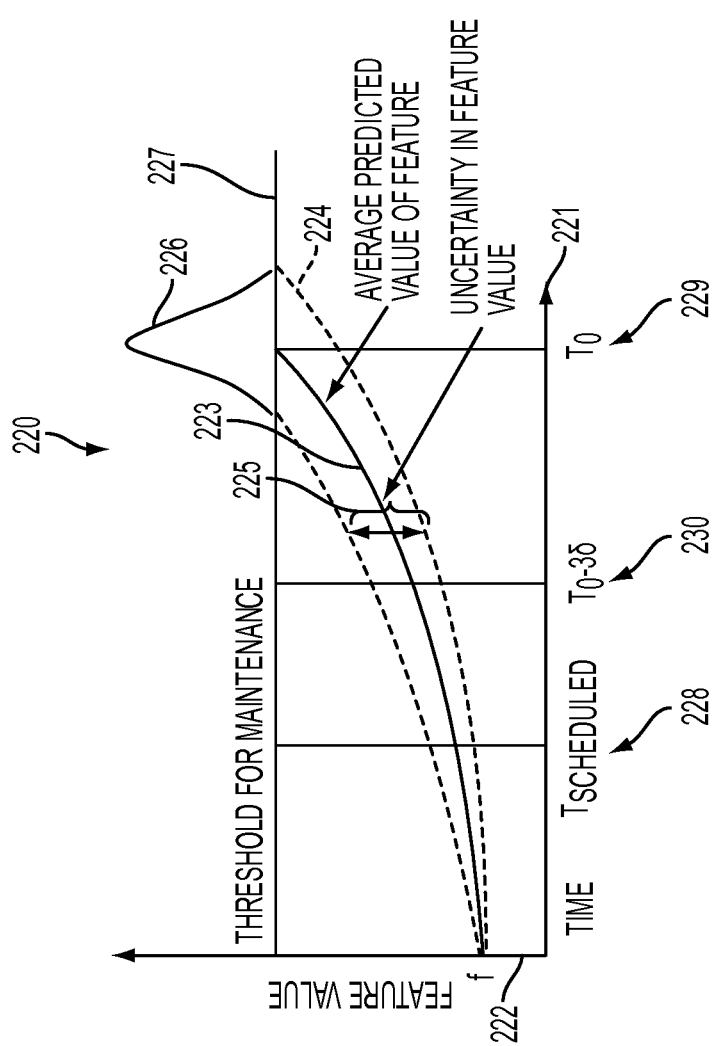

SYSTEM AND METHOD FOR DETERMINING VEHICLE COMPONENT CONDITIONS

FIELD

This application relates in general to vehicle maintenance, and in particular, to a system and method for determining vehicle component conditions.

BACKGROUND

As the population increases across parts of the world, many cities are forced to deal with high traffic volumes, which results in traffic congestion. In an attempt to ease the congestion, many cities are working on implementing shared passenger transportation services, including rapid transit systems, trains, monorails, trams, light rails, and other types of commuter rail systems. Use of shared transportation can reduce the number of vehicles on the roads, which in turn lessens the traffic congestion.

Although public transportation provides a popular option for reducing traffic, the vehicles can be expensive to maintain, including labor and parts replacement. For example, most public transportation vehicles, such as trains and busses, include doors that open and shut to allow passengers to enter or exit the vehicle. The doors must be regularly maintained to prevent unexpected malfunctioning, which may result in unscheduled downtime of the vehicle for repair, disruption of passenger pick-up schedules for the vehicle, and customer dissatisfaction.

Generally, maintenance is scheduled based on manufacturer guidance or lab testing. Yet, utilizing only the guidelines and lab testing for scheduling maintenance can fail to provide accurate results based on an actual condition of the vehicle, which results in unnecessary maintenance, such as changing parts that are still working. Currently, studies have been performed to assess a condition of automatic train doors using Vibrational Analysis for Remote Condition Monitoring. Specifically, vibrations of a door are measured as the door is moving to an open or closed position and the measurements are used to determine which components are likely to develop faults. However, other measurements, such as the door motor current, can be used to more accurately and specifically identify different conditions of the door, some of which are separate from the components, such as a lack of grease, an object stuck in the door, or an excess of dirt.

Therefore, there is a need for an approach to accurately identify current and future component conditions to improve the effectiveness of scheduled maintenance and to identify and prevent unexpected component failure.

SUMMARY

Public and private transportation companies, as well as individuals, generally schedule maintenance for their vehicles based on recommendations by the vehicle manufacturer, dealer, or mechanic. The recommendations can help prevent unexpected maintenance failure; however, the recommendations can be overly cautious and require an owner of the vehicle to unnecessarily perform maintenance. A more accurate determination of when maintenance is necessary, such as based on predicted maintenance failures, can save vehicle owners large amounts of time and money. Further, being able to identify a particular condition of a vehicle component without an inspection helps the owner to save money and time.

An embodiment provides a computer-implemented system and method for determining door conditions. A function that maps features to door conditions is stored. Motor current measurements are obtained for a door over a predetermined time period. The features of the motor current measurements are determined based on the stored function. The features are then analyzed by mapping the features to one or more door conditions via a predetermined function. At least one condition of the door is determined based on the analyzed features.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a block diagram showing, by way of example, a confusion matrix for a multi-class fault classification.

FIG. 5 is a block diagram showing, by way of example, a revised confusion matrix for the multi-class fault classification of FIG. 4.

FIG. 16 is a block diagram showing, by way of example, a graph of average predicted values for a component feature over time.

DETAILED DESCRIPTION

As cities experience high levels of traffic congestion, many individual commuters are turning to public transportation, or mass transit, for commuting to and from work or school. Different types of public transportation include rapid transit systems, trains, monorails, trams, and light rails. Generally, public transportation vehicles include vehicle components that are frequently used and require maintenance to prevent unexpected failure. For example, each type of transportation vehicle includes at least one set of doors, which open and close numerous times a day to allow passengers to enter and exit the vehicle. To prevent malfunctioning, maintenance appointments are usually scheduled based on recommendations by the vehicle manufacturer or mechanic. Most recommendations are overly cautious and may require unnecessary inspection, which can be a large expense to an owner of the transportation vehicles for both time and money.

Figure 1:
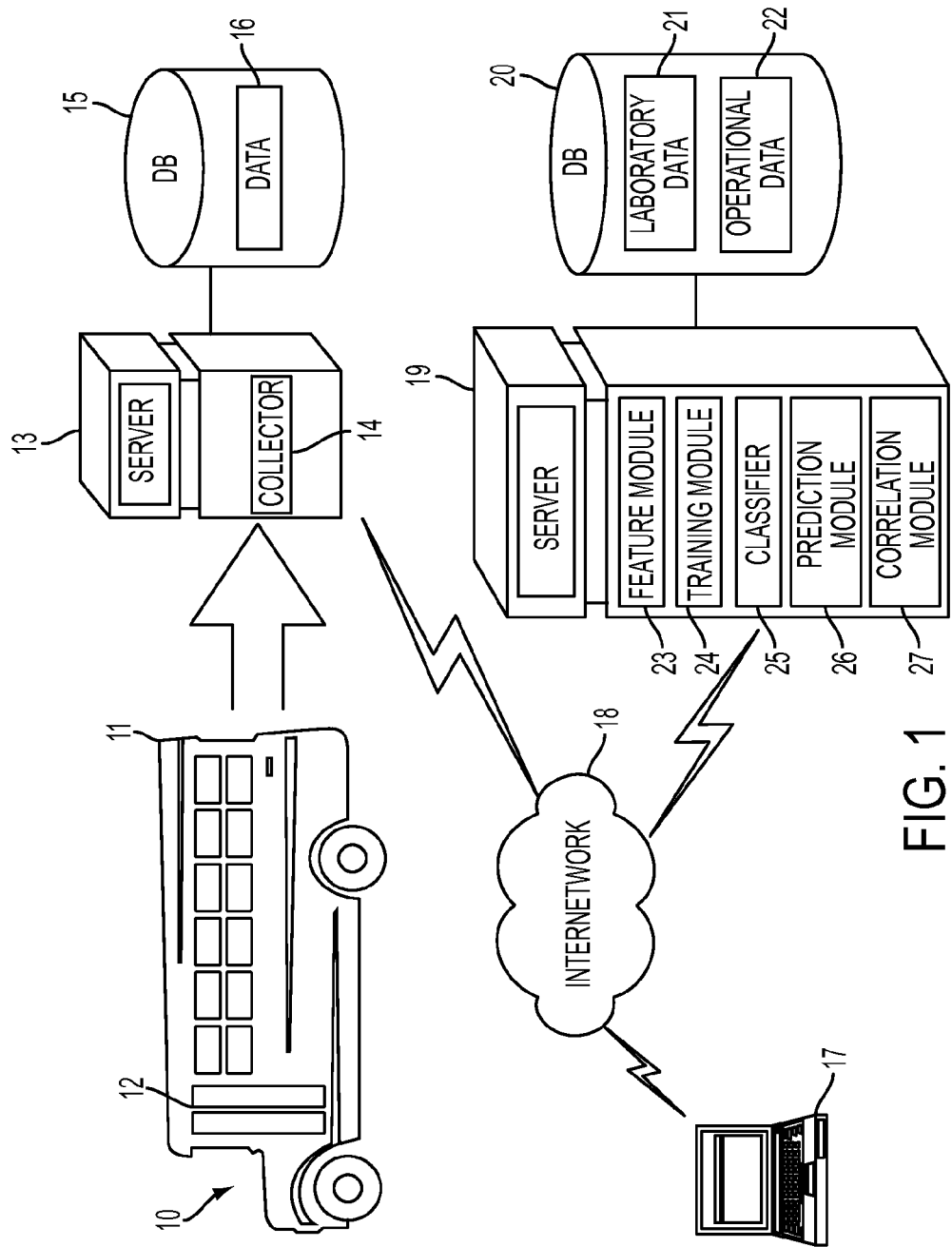
FIG. 1 is a block diagram showing a system for determining door conditions, in accordance with one embodiment.

Accurately identifying a condition of a door, including a particular problem or fault, as well as when the fault is likely to occur, provides a valuable benefit to the transportation vehicle owners by saving time and money. FIG. 1 is a block diagram showing a system 10 for determining door conditions, in accordance with one embodiment. Measurements for a component 12 on a transportation vehicle 11, such as a public transportation vehicle or individual vehicle can be obtained. In one embodiment, the component can be the doors 12 of the vehicle 11 and the measurements can include a sequence of data points for motor current values of the door and door positions, which are collected at successive time instants as time series data. The measurements can be associated with open and close commands for the door, and an operating state. Other components and measurements are possible. Once obtained, the measurements can be stored as operational data 18, in a database 14 interconnected to a server 13. The server 13 and database 14 can be maintained by an owner of the transportation vehicle or a company that manages the transportation vehicle. The server 13 can transmit the data to a condition server 19 via an internetwork, such as the Internet, for analysis, including determining a particular condition of each door, predicting condition based maintenance, and identifying door similarities for maintenance purposes.

A further set of measurements can also be obtained from the transportation vehicle and stored in the database 14 with determined conditions of the vehicle doors, as laboratory data. The conditions can be assigned by a mechanic who has inspected the door, obtained measurements, and then diagnosed the condition. Alternatively, the condition can be automatically assigned. The laboratory data can also be transmitted to the conditions server 19 for use in helping identifying a condition for the operational data.

Specifically, the laboratory data 27 and the operational data 22 can be stored in a database 20 interconnected to the condition server 19. The condition server 19 can include a feature module 23, training module 24, classifier 25, predictor module 26, and correlation module 27. The feature module 23 can analyze both the laboratory data 21 and operational data 22 to determine features from the data, such as a mean, maximum value, minimum value, standard deviation, duration, second highest peak, and second lowest minimum. Other types of features are possible.

Once determined, the training module 24 utilizes the features for the laboratory data 21 to train the classifier 25 along with the known door conditions associated with those features, as further described below with reference to FIG. 3. The training module 24 also uses the laboratory data 21 to test the classifier 25 and ensure that the classifier accurately classifies the operational data 22, as further described below with reference to FIGS. 4 and 5. After training is complete, the features of the operational data 22 are provided to the classifier 25 and a condition of the door can be diagnosed.

In addition to diagnosing a current door condition, maintenance needs can also be predicted. The prediction module 26 identifies long term trends of a transportation vehicle component and determines features that are predictive of certain kinds of faults, as further described below with reference to FIG. 14. The ability to accurately predict maintenance needs focuses on condition based maintenance, which can prevent unnecessary maintenance based on manufacturer recommendations.

Finally, the features of a component can also be used to increase efficiency of maintenance inspections by identifying similarities between doors, identifying doors that are dissimilar from other doors, and determining correlations among different measurements for the component. Determining similarities between doors of a transportation vehicle and determining which doors are outliers can increase maintenance efficiency by identifying those doors that require maintenance and those doors that do not without the need for a manual inspection of each door.

The client and servers can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
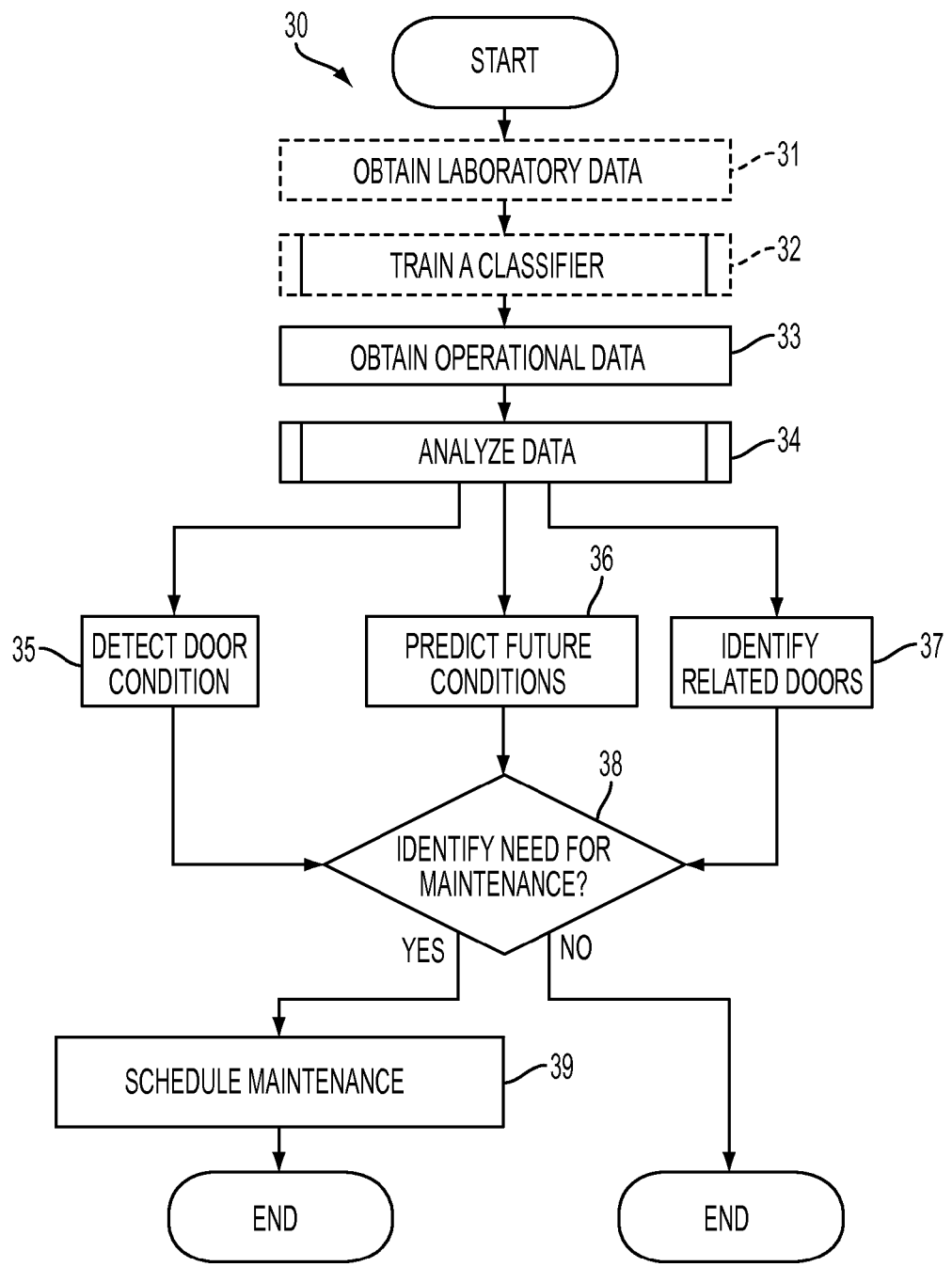
FIG. 2 is a flow diagram showing a method for determining door conditions, in accordance with one embodiment.

Accurately predicting and identifying component problems saves time and money by preventing unexpected component failure, long wait times, and customer dissatisfaction. FIG. 2 is a flow diagram showing a method 30 for determining door conditions, in accordance with one embodiment. Laboratory data can be optionally obtained (block 31) for a component of a transportation vehicle and used to train (block 32) a classifier that can map operational data to a known condition of the component. In one embodiment, the component includes vehicle doors, which will be used in the discussion below, as an example. However, other components are possible, including switch machines, for moving railway tracks. The laboratory data includes measurements of the motor current for one or more of the doors on the vehicle over time and door position, and an underlying door condition associated with the motor current values. In one example, a sample rate of time for the measurements can be ⅒ seconds; however, other durations are possible. The door conditions can include two classifications, normal or abnormal. An abnormal condition can further include specific types of faults, such as an object stuck in the doors, an obstacle in a bottom rail of the door, bending or deformity of the bottom rail, loose bolts, the presence of dirt, and a lack of grease. A determination of loose bolts can further provide an indication of the particular bolt that is loose.

The operational data is obtained for the component of the transportation vehicle (block 33) and includes only motor current and door position measurements for the component over time, and not the underlying door conditions, like the laboratory data. Subsequently, the operational data is analyzed (block 34) to detect a current condition of the door (block 35), to predict future conditions of the door (block 36), and identify related doors (block 37). In one embodiment, the analysis of the operational data can include use of laboratory data models from the trained classifier. For example, the operational data can be provided to the classifier for identifying one or more conditions for the door. However, if the laboratory data and classifier are not available, alternate analyses can be performed to detect a current door condition or predict future conditions, such as by identifying a correlation between two or more doors, performing a feature trend analysis, and outlier detection, which are described further below with reference to FIGS. 7, 10, and 13. If a need for maintenance is identified (block 38) based on the assigned or future conditions, a maintenance appointment can be scheduled. However, if no maintenance is required, an inspection of the door need not be performed.

When laboratory data is available for a component, the data can be used to train a classifier, which can later be used to assign conditions to doors having only operational data. FIG. 3 is a flow diagram showing, by way of example, a process 40 for training a classifier. Laboratory data is analyzed to generate a time series model for the measurements of the door via time series segmentation or functional data analysis. As described above, the laboratory data includes measurements of the motor current for the door and door position, which are collected at successive time instants that are correlated in time, and a condition of the door. The time series segmentation includes plotting the motor current measurements against time and dividing the data into multiple segments, which are representative of different stages of a single open and close cycle for the door. Meanwhile, the functional data analysis includes plotting the motor current measurements against time for a single open and close cycle and fitting a curve to the plotted data points for motor current measurements. An individual associated with the transportation vehicle on which the doors are located can select (block 41) one of the time series segmentation or functional data analysis for generating a time series representation of the laboratory data, or alternatively, one of the methods can be selected automatically or as a default.

For time series segmentation, uniquely identifiable stages for a door open and close cycle are identified as segments. Each segment includes a set of features for a signal of interest, such as the motor current. In one example, a graph of segments for an open and close cycle of a door can be generated with time located along an x-axis and door position located along a y-axis. Door position values for a single open and close cycle, which can be identified by open and close commands that are used to provide instructions to the door to open or close, can be plotted along a curve. In one instance, the curve can represent a curve with a flattened top or a modified bell curve.

The open and close cycle can be segmented into different states using a segmentation algorithm that considers the motor current, open and close commands, and an operating state as input. The different states are plotted along the curve to identify states where the behavior of the door is qualitatively different from the other states. In the laboratory data for the door, each of the open and close commands, and the operating state can associated with a binary value. For example, a value of 1 for the open command can represent an open state of the doors, while a value of 0 represents a closed state. Additionally, a value of 1 for the closed command represents a closed state, while a value of 0 represents an open state. The operating state can be another discrete signal that signifies whether the door is open or closed. This state can be generated, for example, using a switch that turns on/off based on presence or lack of physical contact. In one embodiment, six segments of the cycle are identified, including state 1 for a closed position, state 2 for acceleration, state 3 for constant speed, state 4 for open position, state 5 for acceleration, state 6 for the rest of the cycle till the door is closed again. Segmentation that results in fewer or greater number of states is also possible by altering the segmentation rules.

The different states are identified using a set of predetermined rules that utilize the motor current, the derivative and sign of the motor current, the operating state, and the open and close commands. For example, when an open command is given, the default state 1, signifying a closed door, transitions to the next state 2. If the current state is 2, and the rate of change of current goes from positive to negative, then the state transitions from 2 to 3. Additionally, when an operating state indicates the door is closed, the current state can transition back to the default state 1. Other rules are possible.

However, not all doors have the same measurements and a door with different measurements may be associated with different rules for segmentation. For example, rules for doors associated with measurements for motor current and stroke can include if an open command is given, a default state transitions to state 1. If the value of the stroke does not change, a current state of the door can transition to a state indicating an open door. Also, if the value of the stroke does not change over a predetermined number of successive measurements, and a change in the current value for the last n measurements are each less than a predetermined threshold, then the current state can transition back to the default state.

Once identified, the output of the segmentation includes identification of the different states for an open and close cycle for a single door, which can be plotted on a graph with the motor current values. On the graph, time can be located along an x-axis and motor current, which can be measured in Amperes, can be located along a y-axis. Data points for motor current values of the door versus time and data points for the segmented states that correspond with the motor current data points are plotted on the graph as output for the segmentation.

In a further embodiment, functional data analysis can be applied to the laboratory data collected from the doors to generate a time series representation of the data for a single open and close cycle for the door. The motor current measurements and door position can be plotted against time samples to generate a profile representative of the measurements. A curve is then fit to the profile using a Fourier or spline basis function. Smoothness constraints can be applied to the basis to minimize an impact of noise from the laboratory data. The basis helps identify landmarks for door measurements that can be aligned across different curves.

Figure 3:
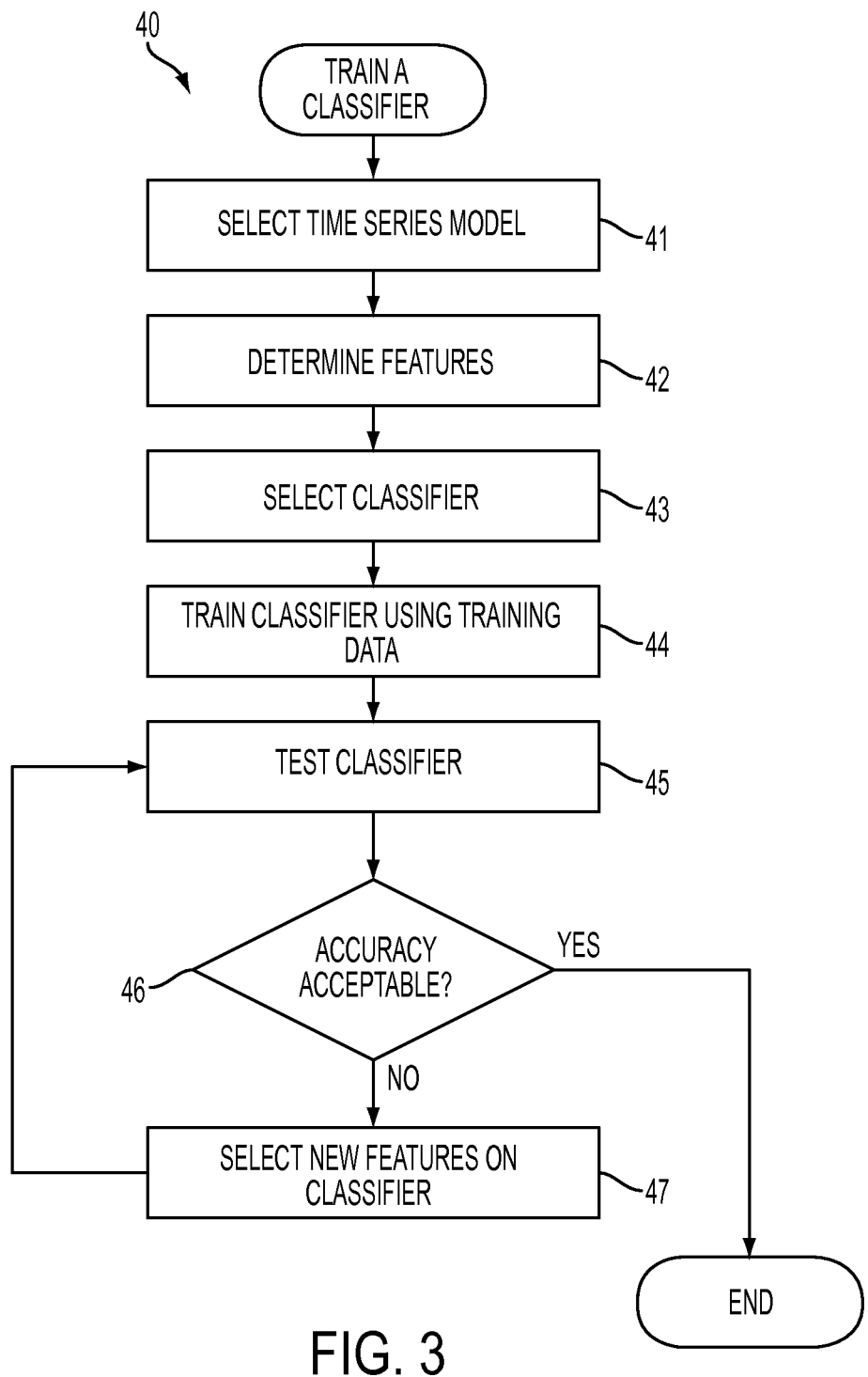
FIG. 3 is a flow diagram showing, by way of example, a process for training a classifier.

Returning to the discussion with respect to FIG. 3, features can be determined (block 42) for each state of an open and close cycle from the segmentation output or for the basis of the open and close cycle. The features for each segmented state can include a mean, maximum, minimum, standard deviation, and duration, as well as other types of features. The mean measures a mean value of the motor current for a state, while the maximum measures a highest value of the motor current in that state and the minimum measures a lowest value of the motor current for that state. The standard deviation measures an amount of variation of the motor current from the mean and the duration measures a time span for the state. Additionally, the features for the basis can include mean, duration, and a particular extremum.

Once identified, the features can be used to train (block 44) a classifier with the known conditions for the laboratory data. Specifically, a function is created for each condition that maps the features to that particular door condition. The classifier can be selected (block 43) from support vector machines, neural networks, and ensemble classifiers, such as Random Forest classifier. Prior to training, the features can split into a training data set for training the classifier and a testing data set for determining an accuracy of the trained classifier. In one embodiment, 60% of the available features can be used for training, while the remaining 40% can be used for testing. However, other percentage splits are possible. In a further embodiment, k-fold cross validation can be used to determine an amount of the feature data to be used for training and testing. Specifically, the features are split into k groups. One of the k groups is used as a testing set, while the remaining k−1 groups are used as the training set. The process is repeated until each of the k groups has been used as the testing set. The results of the testing based on each of the k-groups can then be averaged to determine an accuracy of the classifier.

During training (block 44), n training instances are provided as $(X_i, Y_i)_{i=1,\ldots,n}$, represents a vector of features within each of the current states for the segmented states or for the basis, and $Y_i \in \{Normal, Fault_1, \ldots, Fault_m\}$ represents the normal or faulty condition of the door. Hereinafter, only features of the segmented states will be discussed as an example, although the same processes can be applied to the features of the basis. The training set is then used to learn a model that maps features to a door condition. For example, a feature vector $X_{test}$ can be mapped to a class $Y_{test} \in \{Normal, Fault_1, \ldots, Fault_m\}$. The different faults can include an object stuck in the doors, an obstacle in a bottom rail of the door, bending or deformity of the bottom rail, loose bolts, the presence of dirt, and a lack of grease. Further, for the loose bolt fault, a determination of which bolt is loose within the door can be determined. In a further embodiment, a two-class classification can be used where $Y_{test} \in \{Normal, Abnormal\}$. The classifier can also learn a posterior probability distribution via k nearest neighbors or generalized linear models that indicates a probability of a condition for new observations of the door, such as from the operational data.

After training, the testing set is input (block 45) into the classifier to determine an accuracy of the testing set classification. Specifically, the classification accuracy can be defined as a percentage of a total number of feature data for an open and close cycle correctly classified across all classes. The results of the testing can be represented by a confusion matrix. For an n number of training instances, the confusion matrix $M_{confusion}$ is a n×n matrix, where the element $M_{confusion}(i,j)$ at the ith row and jth column is given by the following equation:

$$M_{confusion}(i, j) = \frac{\text{Number of instances of class } i \text{ classified as class } j}{\text{Total number of instances of class } i} 100 \quad \text{(Eq. 1)}$$

After testing is completed, accuracy of the results is determined. If the results are acceptable (block 46), no further processing of the classifications need be performed. However, if the results are not acceptable, the classifications can be revised, new features can be selected (block 47), or a new classifier can be selected. Ideally, for a two class classification, all instances of, for example, normal should be correctly identified as normal, while all instances of abnormal should be correctly identified. However, small amounts of misclassification can be permissible, such as below 5% misclassification. Large amounts of misclassification, if present, can indicate that different classifications, such as faults, can be difficult to distinguish. For example, FIG. 4 is a block diagram showing, by way of example, a confusion matrix for a multi-class fault classification. A list of the classifications are listed horizontally 81 along a top of the matrix, as well as vertically 82 on a left side of the matrix. The classifications include normal, F1 for an loose bolt, F2 for an obstacle in a bottom rail of the door on an outside, F3 for an obstacle stuck in a bottom rail of the door on the top, F4 for an object in a bottom rail of the door on an inside, and F5 for a lack of grease. Other classifications can be considered such as a bent or deformed rail of the door, and object stuck in the door, and a presence of dirt. The values of the matrix 83 represent a percentage that a classification on the left side of the matrix was correctly or incorrectly identified as a classification listed along the top of the matrix. For example, in the first row, the normal classification was correctly identified as normal 95.1% of the time, while the normal classification was incorrectly identified as F1 0.5% of the time.

The classifications for normal, F1 and F5 appear highly accurate, as indicated by the percentages of 91.4% and above. However, despite the high accuracy, some misclassification occurred. For example, there is some confusion between the normal classification and F1, or fault 1. In particular, some fault 1 data is misclassified as normal data. Fault 1 corresponds to a loose bolt. In this case, the cause of confusion may be due to a looseness of the bolt. For example, a bolt that is only a little loose, may be confused with a tightened bolt; however, those bolts that are very loose will not be confused. Detecting confusion for other conditions are possible. For example, confusion between a normal state and when an object is stuck in the door may be due to objects that are not stiff and the door may not experience a lot of resistance during opening and closing since the object was not stiff, and was thus, classified as normal. Another reason for the confusion is that the classifier may assign almost equal probabilities to both conditions of normal and fault. To prevent confusion when equal probabilities are assigned, the classifier can also be instructed to output an "uncertain" notification.

In contrast to the highly accurate classifications, the classifications for F2, F3, and F4 had accuracy percentages varying from 55.6% to 70.4%, which are not very accurate and indicates that the classifier has trouble distinguishing between the faults for an obstacle stuck at different positions on the bottom rail of the door. Since each of the faults corresponds to some kind of bottom rail obstacle, the classes can be combined in an attempt to obtain higher accuracy results for classifying an obstacle in the bottom rail of a door versus the other faults, such as a loose bolt. FIG. 5 is a block diagram showing, by way of example, a revised confusion matrix 90 for the multi-class fault classification of FIG. 4. In the revised confusion matrix 90, the door conditions are located both horizontally and vertically along the graph. The classifications for F2, F3, and F4 are combined into a single condition. As shown by the value for a comparison of the combined condition, the accuracy rate for correctly identifying an obstacle in a bottom rail of the door is now 98.6%. In a further embodiment, a confusion matrix can be generated for identifying a specific bolt that is loose when a loose bolt has been identified for the door. Based on the classification testing results, some features may be identified as more predictive of classifying a door for a particular condition.

Figure 6:
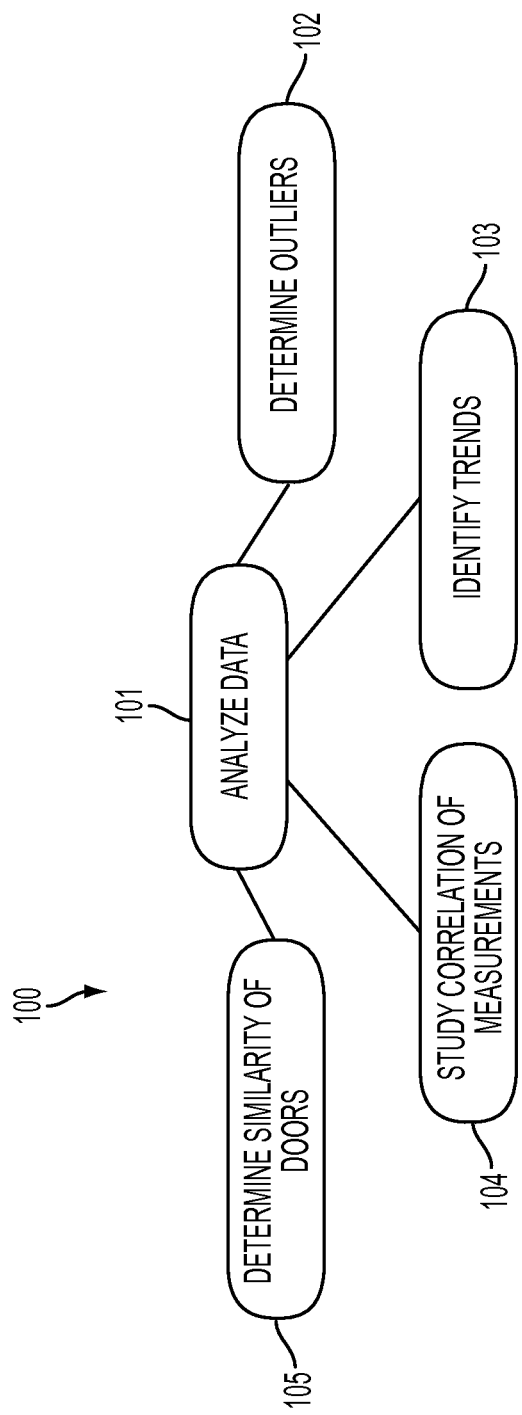
FIG. 6 is a flow diagram showing, by way of example, methods for analyzing operational data.
Figure 7:
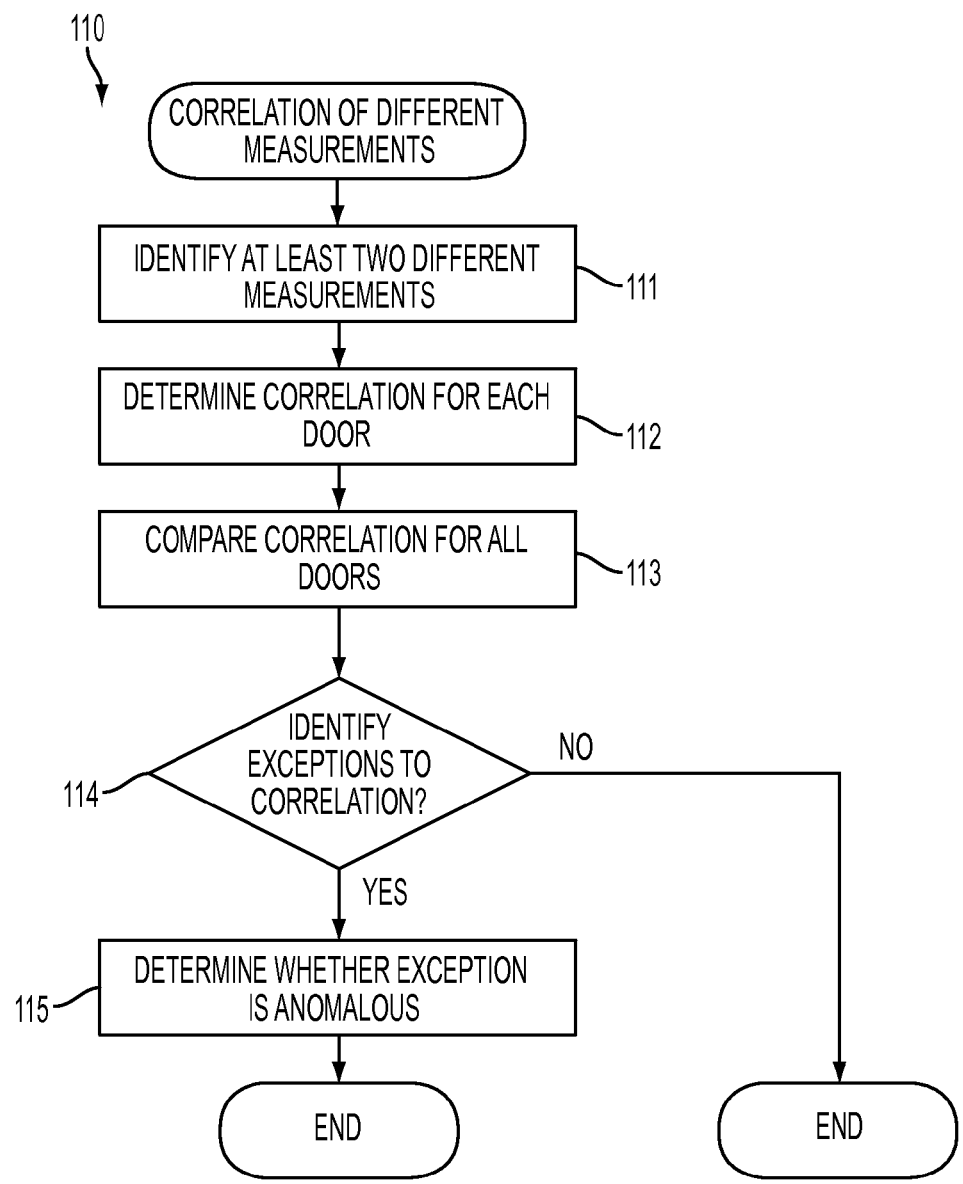
FIG. 7 is a flow diagram showing, by way of example, a process for correlating different measurements for a door.

Once the classifier has been trained and can accurately assign classifications to doors, operational data can be input into the classifier for classification of a door. However, in some instances, laboratory data used to train the classifier may not be available. Other processes for analyzing the operational data are possible to identify a problem or predict a fault. FIG. 6 is a flow diagram showing, by way of example, methods 100 for analyzing 101 operational data. The operational data can be processed to determine a similarity 105 or dissimilarity between doors, a correlation 104 of different measurements for a single door, long term trends 103 exhibited by the door, and outliers 102. Identifying a correlation among different measurements 104 can help identify whether any new information can be gained and whether seasonal dependencies exist based on correlations with external temperature. FIG. 7 is a flow diagram showing, by way of example, a process 110 for correlating different measurements for a door. Two different measurements can be identified (block 111) for comparison. A correlation coefficient of the measurements is determined (block 112) for each door on the transportation vehicle. The correlation coefficients can be determined via Euclidean distance or maximum distance of the measurement values. Other methods for determining similarity are possible.

Figure 8:
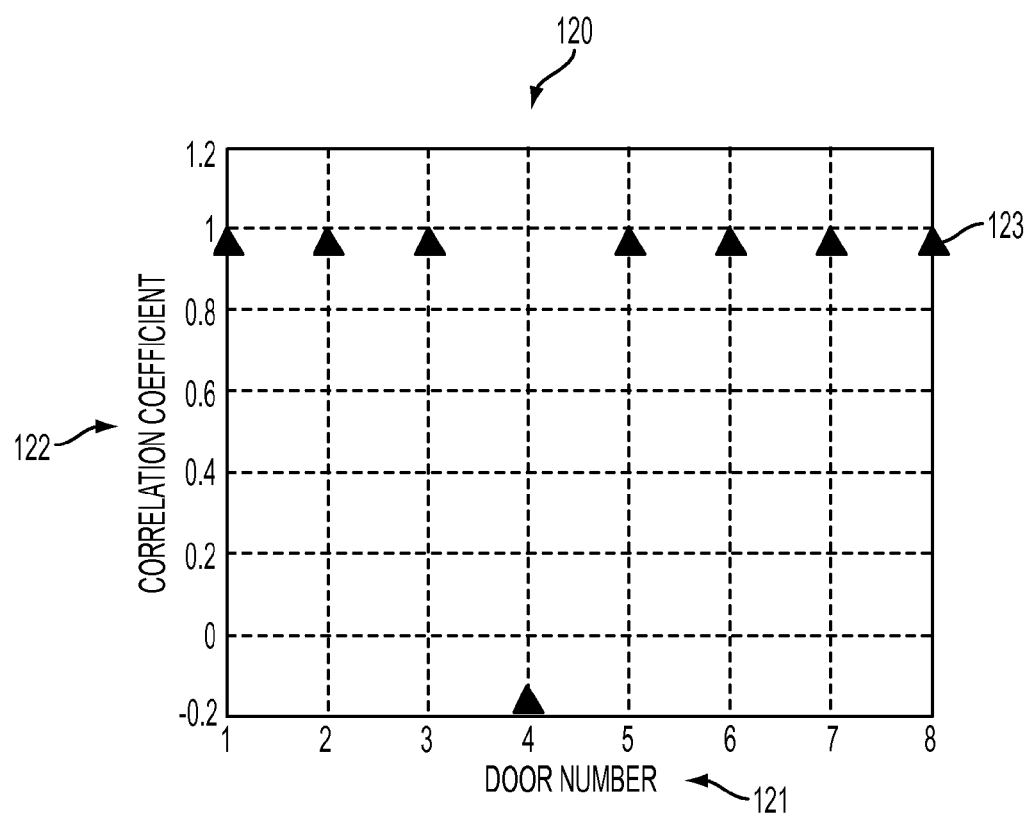
FIG. 8 is a block diagram showing, by way of example, a graph correlating different measurements for different doors.

The determined correlation coefficients are then compared (block 113) for all the doors. In one example, the correlation coefficients can be compared via a graph. FIG. 8 is a block diagram showing, by way of example, a graph 120 correlating different measurements for different doors. The doors of a transportation vehicle are listed along an x-axis 121, while a correlation coefficient of two different measurements for the doors are listed along a y-axis 122. In this example, the measurements are motor temperature and outside temperature. As described above, a correlation coefficient is determined between the motor temperature and outside temperature measurements for each door. Once determined, values 123 for the correlated coefficients are plotted on a graph for each door. Returning to the discussion of FIG. 7, doors that are correlation exceptions can be identified (block 114). In particular, the correlation exceptions include doors that do not show a strong correlation between the measurements when the remaining doors show a strong correlation of the measurements. For example, on the graph 120, the measurements appear to be highly correlated for doors 1, 2, 3, 5, 6, 7, and 8, with the exception of door 4. The door exceptions can be identified based on a threshold, including a standard deviation value. For example, if the correlation coefficient for one door is a predetermined number of standard deviations away from the other doors, then that door is an exception. Alternatively, if the door satisfies a threshold for a measure of dissimilarity from the other doors, then that door is an exception. Other means for determining door exceptions are possible.

The lack of correlation identified for door 4 may be due to abnormal outside temperature readings, abnormal motor temperature readings, or a fault of the door. Further analysis of the measurements can be performed to determine (block 115) whether at least one of the measurements for the excepted door 4 is anomalous and if anomalous, inspection or maintenance can be scheduled for the door.

Figure 9:
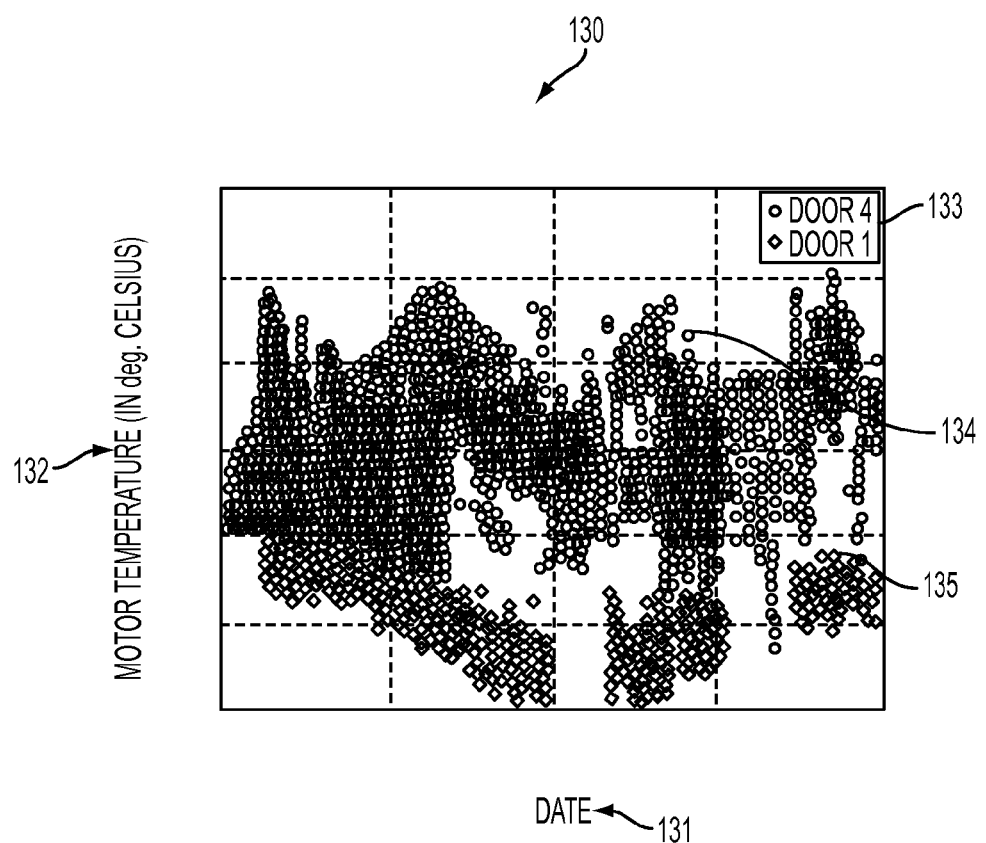
FIG. 9 is a block diagram showing, by way of example, a graph of one of the measurements from the graph of FIG. 8 for two of the doors.

To further analyze the lack of correlation, the motor temperature readings can be compared for door 4 and one of the other doors showing a high correlation between the measurements, such as door 1. FIG. 9 is a block diagram showing, by way of example, a graph 130 of one of the measurements from the graph of FIG. 8 for two of the doors. Dates are listed along an x-axis 131 of the graph 130, while motor temperature is listed along a y-axis 132. Data points for the separate motor temperature measurements for door 1 135 and door 4 134 are plotted on the graph according to the legend 133. On the graph, most of the data points 135 for door 1 appear to have lower motor temperature readings than the data points 134 for door 4. An anomaly can be determined for the data using, for example, Robust Principal Component Analysis. In this example, the motor temperature readings for door 4 are anomalous. Reasons for the anomaly can include a problem with the temperature sensor or a problem with the motor itself. However, based on the anomaly identified for door 4, an inspection can be scheduled to determine whether the motor is not working correctly or the temperature readings are inaccurate. Additionally, since the remaining doors are associated with correlation coefficients that are similarly related, no further inspection of those doors may be necessary.

Other measurements can be analyzed for identifying a correlation, such as outside temperature with other measurements, including a sum of the motor current during opening of the doors, a maximum current during opening, a minimum current during opening, a mean current during opening, and a standard deviation of current during opening. In one example, when the sum of the motor current and the mean value of the motor current are compared with the outside temperature, a strong negative correlation is identified, which indicates that more effort is required to open the door during cold weather. The outside temperature can also be analyzed with measurements associated with closing of the doors to determine whether cold weather also affects closing. In one example, strong correlations for outside temperature and door closing did not exist. The correlations are helpful in predicting future maintenance.

Figure 10:
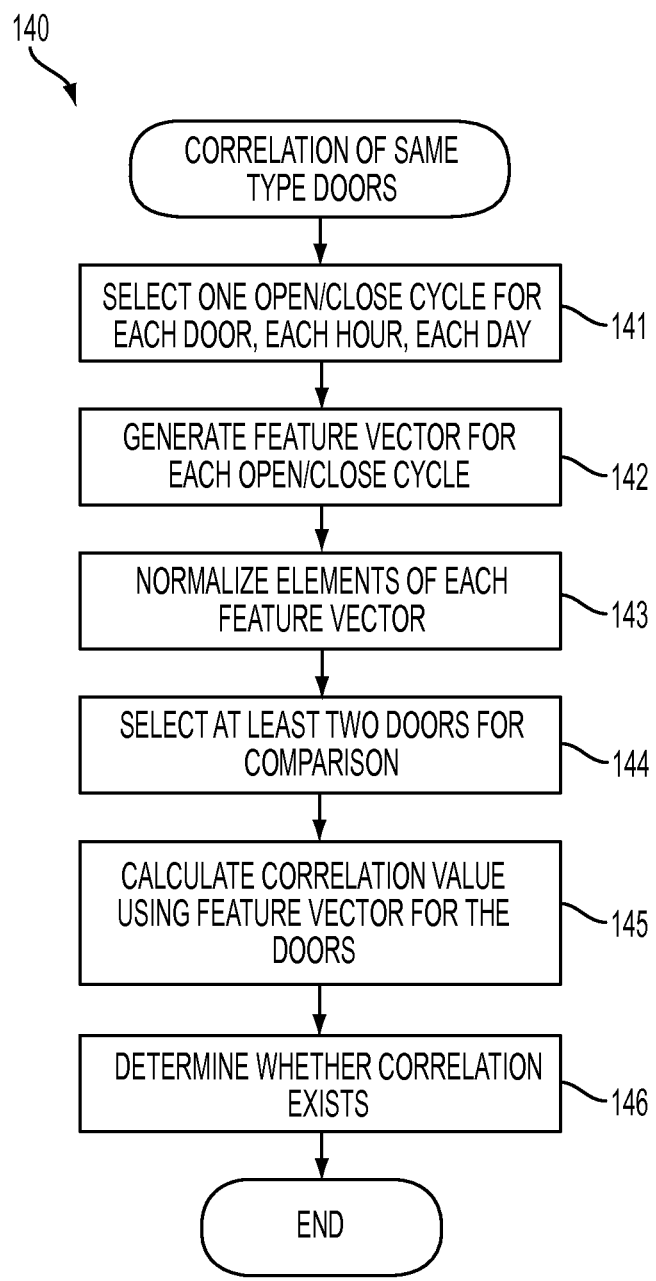
FIG. 10 is a flow diagram showing, by way of example, a process for determining whether a correlation exists between doors on a common transportation vehicle.

Correlations between different doors of a same type can also be determined to accurately identify doors that may need inspection or maintenance, and reduce time and money spent on unnecessary scheduled maintenance appointments. FIG. 10 is a flow diagram showing, by way of example, a process 140 for determining whether a correlation exists between doors on a shared transportation vehicle. One open and close cycle is selected (block 141) from the operational data for each door to be analyzed, for each hour and each day over a predetermined time period. A feature vector is then generated (block 142) for each selected open and close cycle using the features described above with respect to FIG. 3 that are associated with that open and close cycle. For instance, a feature vector for a door can be represented as:

$$f_i=(\text{hour},\text{month},\text{year})=[\max(\text{current}),\min(\text{current}),\\ \text{mean}(\text{open current}),\text{mean}(\text{closing current}),\text{average}(\text{outside temperature}),\text{average}(\text{motor temperature})] \quad (\text{Eq. 2})$$

The subscript i represents an identification of the door for which the feature vector applies.

Once generated, each element, or feature, within the feature vectors can be normalized (block 143). In one embodiment, each element of the vector is normalized by a maximum value for that element across all open and close cycles. Two doors, s and t, are selected (block 144) for comparison. Specifically, for each feature, i, a measure of similarity between the vectors on a given day and hour for door s and door t is determined (block 145) as a correlation value $\text{Corr}_{st}$, using the equation listed below:

$$\text{Corr}_{st}(\text{hour, month, year}) = \frac{\sum_{i=1}^{n}(f_{s_i}-\overline{f}_{s_i})(f_{t_i}-\overline{f}_{t_i})}{\sqrt{\sum_{i=1}^{n}(f_{s_i}-\overline{f}_{s_i})^2}\sqrt{\sum_{i=1}^{n}(f_{t_i}-\overline{f}_{t_i})^2}} \quad (\text{Eq. 3})$$

where $\overline{f}_{s_i}$ and $\overline{f}_{t_i}$ are the means of the feature vectors $f_{s_i}$ and $f_{t_i}$ over the time period, respectively. Other methods for determining similarity are possible, including standard Euclidean distance and a maximum difference of the individual features.

Figure 11:
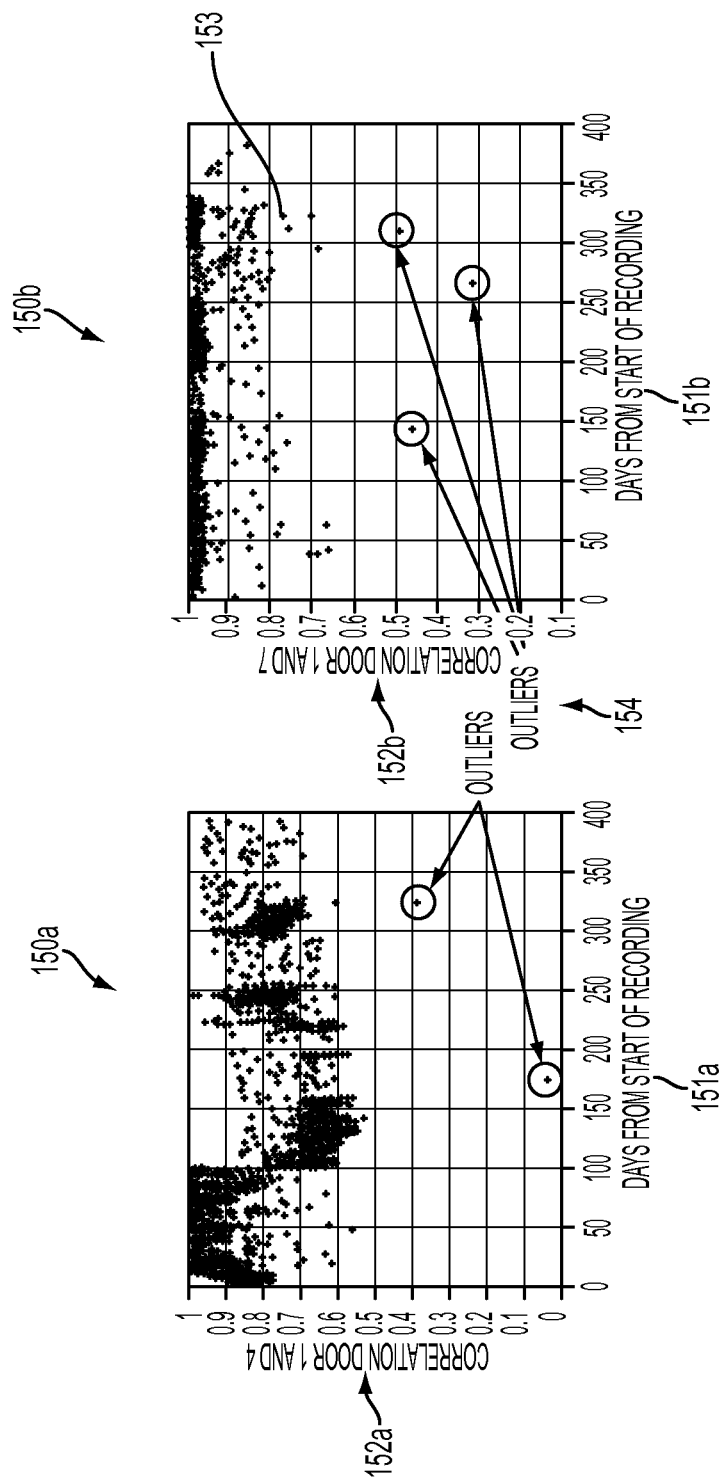
FIG. 11 is a block diagram showing, by way of example, two separate graphs each representative of correlation data for a pair of doors.

Subsequently, based on the correlation value, a determination is made as to whether a correlation exists (block 146). In one embodiment, a predetermined threshold can be applied to the correlation value and if the correlation value satisfies the threshold, the doors are correlated. In a further embodiment, the correlation values can be plotted on a graph for a pair of door for a visual determination of correlation. FIG. 11 is a block diagram showing, by way of example, two separate graphs 150a, 150b each representative of correlation data for a pair of doors. A first graph 150a represents correlation data for doors 1 and 4, while a second graph 150b represents correlation data for doors 1 and 7. Each graph lists time, such as days, along an x-axis 151a, 151b and correlation values along a y-axis 152a, 152b. The correlation values for each door pair are plotted as data points 153 in their respective graphs 150a, 150b.

A comparison of the graphs provides important information regarding a similarity of the doors compared, trends in the correlation data, and outliers. With respect to the graphs of FIG. 11, doors 1 and 4 are less similar to each other as compared to doors 1 and 7, as indicated by the lower correlation values for doors 1 and 4. The lower correlation values for doors 1 and 4 are likely to the anomalous motor temperature readings of door 4, as described above with respect to FIGS. 8 and 9. Also, the correlation values appear to be lower towards the middle of the graph, around 150 days to 250 days, which indicates a seasonal effect since the days in the middle of the graph represent colder weather months and the correlation values begin to increase during the warmer weather months. As described above with respect to FIG. 9, opening of the doors may function differently in cold weather and require more work to open, which is indicated by the graphs 151a, 151b. Additionally, outliers 154 can be observed in the graphs 150a, 150b. The outliers are values that deviate from the other values of the graph enough to indicate that a door may be experiencing a problem or fault. Further inspection of the doors may be necessary when outliers are detected, as further described below with reference to FIG. 13.

Figure 12:
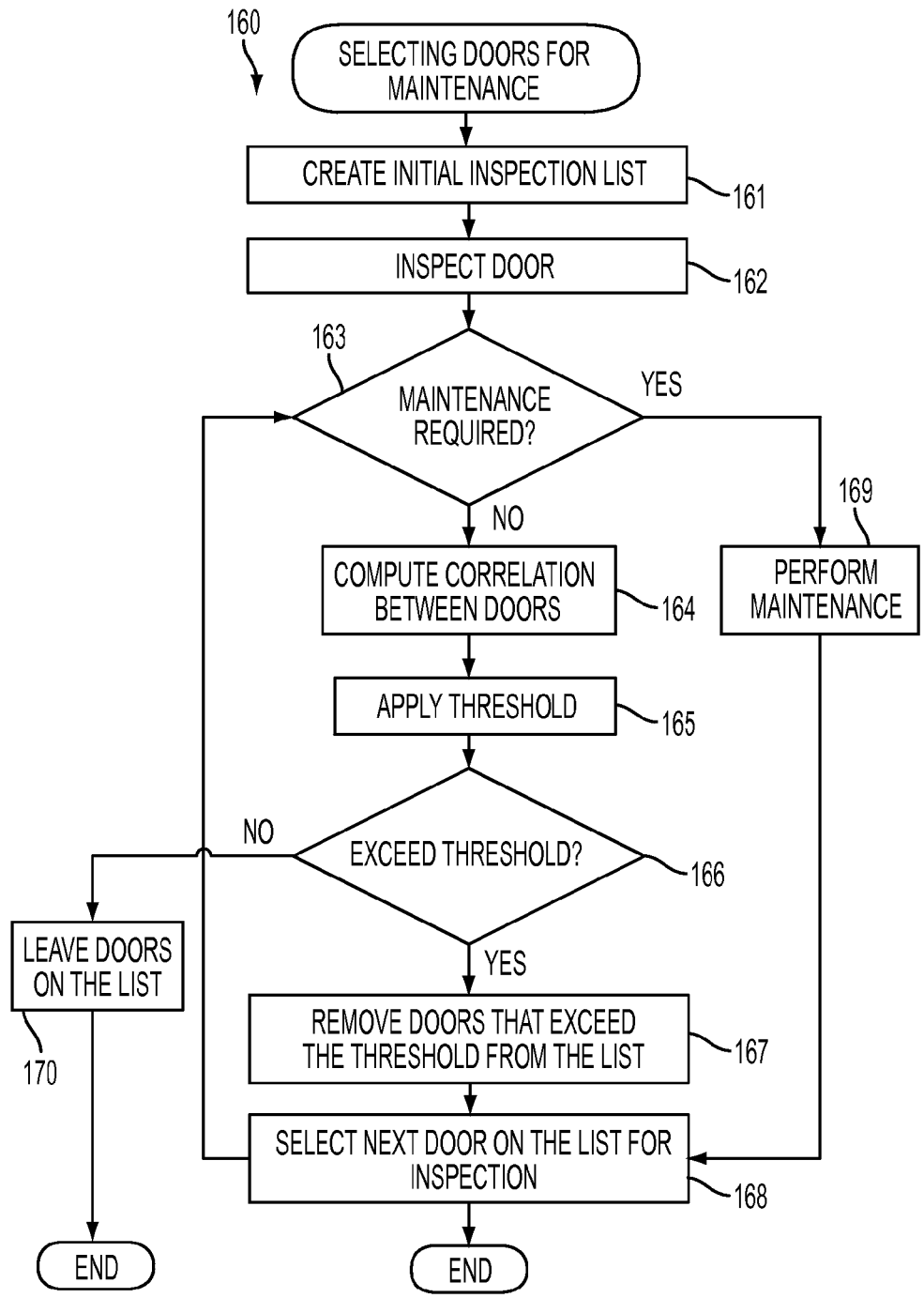
FIG. 12 is a flow diagram showing, by way of example, a process for efficiently scheduling maintenance appointments.

The ability to identify similar doors can help increase efficiency of scheduled maintenance practices by eliminating a need to spend time on doors that do not require maintenance, even though maintenance may be recommended for those doors by the vehicle manufacturer. For example, for scheduled maintenance, maintenance personnel generally need to spend time to inspect the interior of a door operating mechanism and then decide what maintenance actions are necessary. The maintenance actions can include tightening bolts, and cleaning the various parts. Other types of maintenance actions are possible. FIG. 12 is a flow diagram showing, by way of example, a process 160 for efficiently scheduling maintenance appointments. To identify doors that do and do not require maintenance, all doors are input (block 161) on an initial inspection list. A door on the initial inspection list is inspected (block 162) and a determination (block 163) is made as to whether maintenance is required for the door.

If maintenance is required, then the maintenance can be performed (block 169) and a next door on the list is selected (block 168) for inspection. However, if no maintenance is required, then a similarity is determined (block 164) between the inspected door and all the other doors on the initial inspection list as a correlation value, as described above in detail with respect to FIG. 10. A predetermined threshold is then applied (165) to the correlation values. The threshold can be computed based on past historical evidence and measurements, which can be collected, for example, whenever a door panel is opened and a conclusion is made that no maintenance is required. Other thresholds are possible. For example, data for the door for which no maintenance is needed should be recorded as historical evidence. In one example, if the history includes N doors, then the correlation value can be computed between all N(N−1)/2 pairs of doors. An average of the correlation values can then be calculated as the threshold.

The doors with correlation values that exceed (block 166) the threshold are removed (167) from the initial inspection list, as needing no inspection. The next door on the initial inspection list is then selected (block 168) for inspection. Alternatively, if the correlation values for the doors do not exceed the threshold, then the doors remain (block 170) on the initial inspection list.

Figure 13:
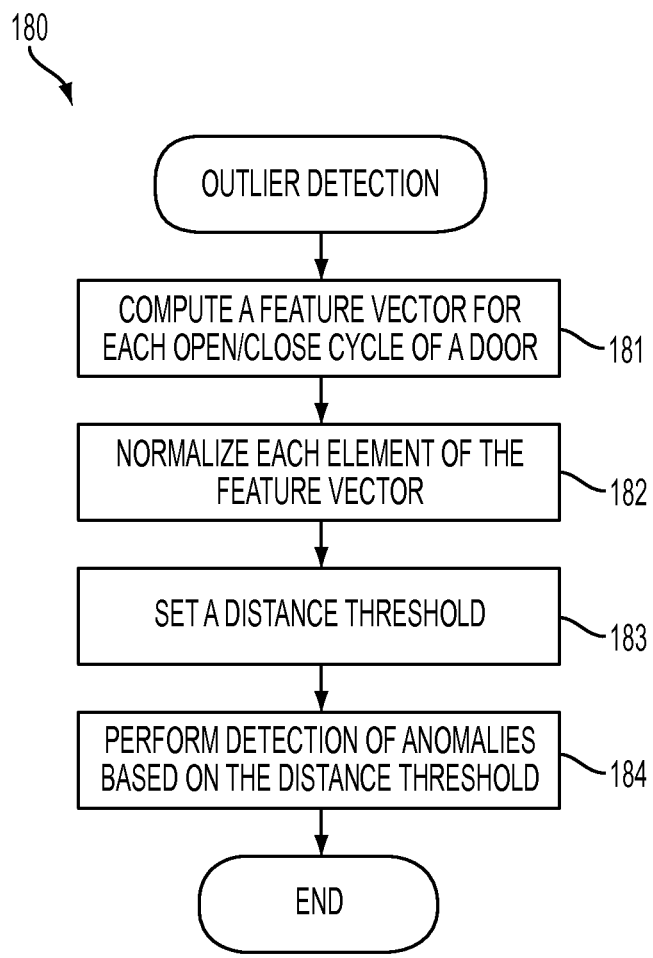
FIG. 13 is a flow diagram showing, by way of example, a process for detecting outliers.

In addition to identifying doors for current inspection, being able to identify future door conditions can help prevent unexpected failure. Determining outliers can help detect events that may signify a future door failure, or identify doors that need maintenance or further inspection. In one embodiment, Robust Principal Component Analysis can be used for outlier detection; however, other methods for detecting outliers are possible. FIG. 13 is a flow diagram showing, by way of example, a process 180 for detecting outliers. A feature vector is generated (block 181) for each open and close cycle of a door within a dataset and each element of the feature vectors can be normalized (block 182), both of which are described above with respect to FIG. 10. A distance threshold is set (block 183) to define outliers and a selected outlier detection algorithm identifies (block 184) the outliers based on the distance threshold.

Figure 14:
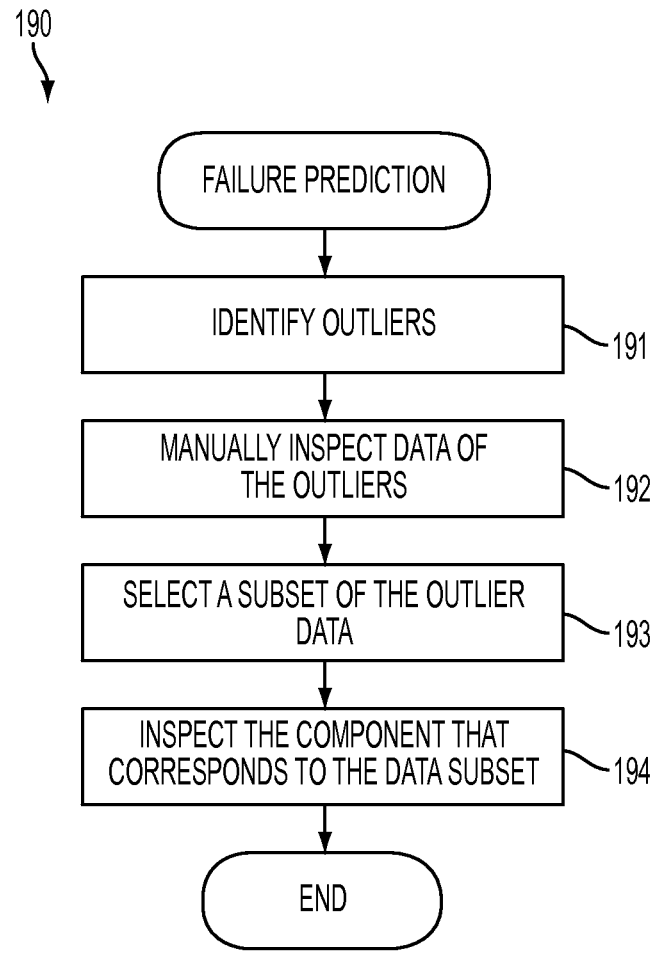
FIG. 14 is a flow diagram showing, by way of example, a process for predicting failure of a door.

The outliers can be used to predict failure of a component. FIG. 14 is a flow diagram showing, by way of example, a process 190 for predicting failure of a door. Outliers that are different enough from known normal and faulty data to warrant further inspection are selected (block 191). The outliers can be determined using the process described above with respect to FIG. 13. During outlier detection, a tradeoff exists between an inspection effort of the doors and a risk of unscheduled failure. The tradeoff is implemented by setting a predetermined threshold on the outlier scores. Specifically, the threshold used to identify the outliers can originally be set high, such that less than one percent of events are classified as outliers. Then, the threshold can be optimized based on field data similar to setting the threshold for determining similar doors.

The data associated with the outliers is manually inspected (block 192) using, for example, a dashboard application that runs on a computer to allow a maintenance technician to visually analyze the data. Based on the manual inspection, a subset of the outlier data can be selected (block 193) for further inspection. The doors corresponding to the selected subset of outlier data can be inspected (block 194) for defects.

In a further embodiment, outlier detection can also be used to identify doors most in need of maintenance or inspection. For example, a maintenance budget allows inspection of only five doors per transportation vehicle. The five doors that are in the worst conditions should be selected for inspection and any necessary maintenance. The five doors can be identified via outlier detection.

The operational data for a door can also be used to identify long term trends of a door component. The trends are linked to usage and can help predict future faults of a door. As described above, some features are more predictive of particular faults than other features. A model for such predictive feature can be fit as linear in a number of the door openings and in the motor temperature, as provided below:

Predictive feature $B0+B1$(door open cycle number)+
    $B2$(average outside temp. over open/close cycle)   (Eq. 4)

Coefficients B1 and B2 represent relative sensitivities of the predictive feature to the number of door openings and average outside temperature, respectively. The coefficient B0 is a static term and represents the value of the predictive feature for a new unused door at 0 degrees Celsius. Each of the coefficients can be determined for all the doors using a robust linear regression, as well as other methods. Determination of long terms trends, as described above, shows that usage has an effect on a condition of a door.

Figure 15:
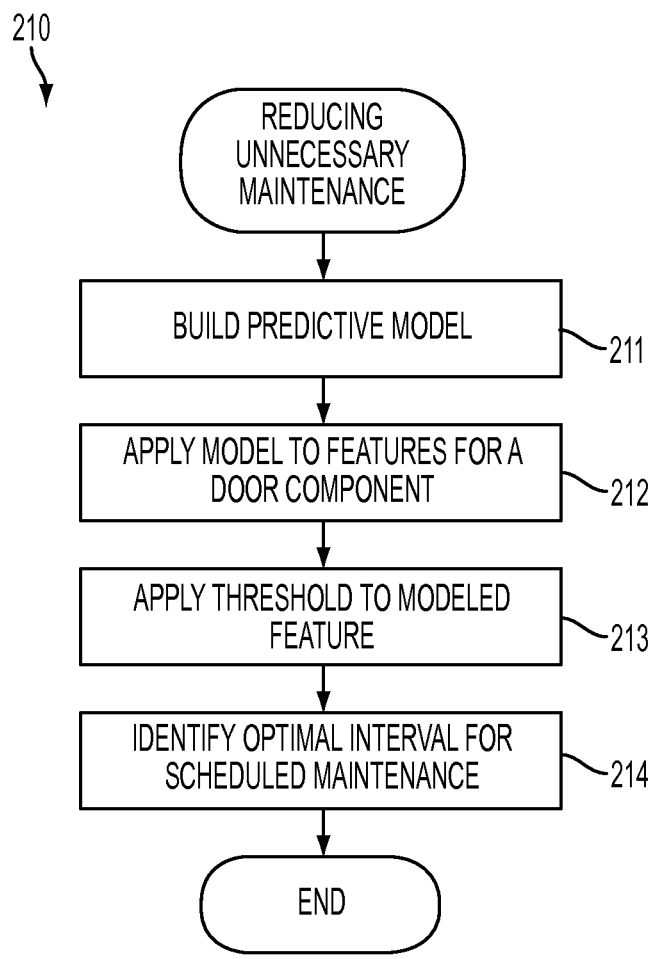
FIG. 15 is a flow diagram showing, by way of example, a process for reducing unnecessary maintenance based on predictive faults.

Identifying future faults can be useful for accurately predicting when a particular fault may occur so that maintenance can be performed. FIG. 15 is a flow diagram showing, by way of example, a process 210 for reducing unnecessary maintenance based on predictive faults. A model with predictive trends is built (block 211) to predict component failures. The model is applied (block 212) to one or more features of the component and can be mapped on a graph. A threshold is applied to the modeled feature (block 213) and an optimal interval for scheduled maintenance is determined (block 213).

In one example, identification of future faults is used for scheduling condition-based maintenance, instead of relying on manufacturer recommendations for scheduling. FIG. 16 is a block diagram showing, by way of example, a graph 220 of average predicted values for a component feature over time. Time is located along an x-axis 221 of the graph 220, while values for the feature are located along a y-axis 222. Values for the component predicted over time are averaged and plotted along a curve 213 on the graph 220. Along the x-axis, $T_{scheduled}$ 228 is identified as the optimal interval for scheduled maintenance based on factors other than the actual condition of the component, such as recommendations from a manufacturer or mechanic. However, the recommendations are often overly cautious resulting in maintenance when none is required. Thus, to prevent unnecessary maintenance, future maintenance, which is based on actual conditioning of the door and future trends, is used to extend the scheduled maintenance interval for time beyond $T_{scheduled}$ without a high risk of component failure.

To determine the extended maintenance schedule, a probability distribution of time when the feature value will cross the threshold is determined. When the curve 223 for the feature value crosses the threshold, a maintenance action may be necessary. A time at which the feature curve will cross the threshold can be determined. However, since the curve represents an average of predicted values for the feature, uncertainty exists for the time when the curve crosses the threshold. The curve 226 above the threshold identifies a probability distribution of the time when the feature's value is expected to cross the threshold. A mean of the probability distance is at $T_0$ 229 and has a standard distribution of $\sigma$. To ensure that failure does not occur before maintenance is performed, a time period prior to $T_0$ is selected. The extended maintenance schedule can then be set automatically, or by an individual associated with the transportation vehicle. In one example, the extended time period can be set at $T_0-3\sigma$ 230. Other time periods for scheduling the extended maintenance are possible between $T_{scheduled}$ and $T_0$. At a minimum, the extended scheduled time should be prior to $T_0$ to ensure that maintenance is provided prior to the estimated failure.

Thus, each feature, such as a loose bolt or low grease, is analyzed for a component to determine when maintenance is needed for the particular feature. For example, based on current usage patterns, a loose bolt may be predicted to occur in two years, while the level of grease may become too low within the next six months.

An overall system model can be generated for all the models generated for each feature associated with one or more components in the transportation vehicle to impose an overall maintenance strategy. Commercial tools, such as BlockSim, can be used to generate the overall system model.

Although the above diagnostic and prediction of conditions has been identified with respect to transportation vehicle doors, other components are possible, including a switch machine for railway tracks. Additionally, the diagnostic and prediction analyses can be applied to automatic doors in a building, or elevators and escalators. At a minimum, measurements of motor current across time must be available.

While the invention has been particularly shown and described as referenced to the embodiments thereof, those skilled in the art will understand that the foregoing and other changes in form and detail may be made therein without departing from the spirit and scope of the invention.

What is claimed is:

1. A method for determining vehicle component conditions, comprising:
    storing diagnostic functions that map one or more features of motor current measurements to different door conditions, wherein each door condition comprises a problem with operation of a vehicle door;
    obtaining the motor current measurements for a door over a predetermined time period;
    identifying at least one open and close cycle of the door during the predetermined time period comprising movement of the door from an open state to a closed state or a closed state to an open state;

selecting the motor current measurements occurring during the at least one open and close cycle;
calculating the features from the motor current measurements obtained during the at least one open and close cycle, comprising one of:
performing:
dividing the at least one open and close cycle into at least three different states, wherein each state is identified using a different predetermined rule based on one or more of motor current, door commands, and operating state;
identifying the motor current measurements for each state; and
calculating statistical measurements as the features for each state in the at least one open and close cycle; and
performing:
plotting the motor current measurements for the at least one open and close cycle on a graph;
fitting a mathematical function to the plotted motor current measurements for the at least one open and close cycle; and
identifying coefficients of the fitted mathematical function of the motor current measurements as the features;
analyzing the features of the motor current measurements by mapping the features to one or more door conditions via the stored diagnostic functions; and
identifying from the different door conditions at least one problem with the door based on the analyzed features that correspond with the door condition for that problem.

2. A method according to claim 1, further comprising:
determining the diagnostic functions that map at least one of the motor current features to the different door conditions via supervised machine learning.

3. A method according to claim 1, further comprising:
dividing the motor current measurements for a single open and close cycle of the door into states prior to determining the features of the motor current measurements, wherein the features of the motor current measurements include a subset of features for each state in the at least one open and close cycle of the door.

4. A method according to claim 1, further comprising:
determining the states of the motor current measurements for the at least one open and close cycle of the door using a set of rules dependent on the motor current measurements and related to different phases of the at least one open and close cycle.

5. A method according to claim 1, wherein the different door conditions each comprise one of presence of dirt, lack of grease, one or more loose bolts, a presence of objects foreign to the door, and rail deformity.

* * * * *